United States Patent
Min et al.

(10) Patent No.: US 8,456,778 B2
(45) Date of Patent: Jun. 4, 2013

(54) WRITER DESIGN WITH ENHANCED WRITABILITY

(75) Inventors: Tai Min, San Jose, CA (US); Yuhui Tang, Milpitas, CA (US); Suping Song, Fremont, CA (US); Lijie Guan, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 86 days.

(21) Appl. No.: 13/068,652

(22) Filed: May 16, 2011

(65) Prior Publication Data

US 2012/0295132 A1 Nov. 22, 2012

(51) Int. Cl.
*G11B 5/33* (2006.01)

(52) U.S. Cl.
USPC ................................................ 360/125.03

(58) Field of Classification Search
USPC ................................................ 360/125.03
See application file for complete search history.

(56) References Cited

U.S. PATENT DOCUMENTS

| | | | |
|---|---|---|---|
| 6,063,491 A * | 5/2000 | Fujikata et al. | 428/332 |
| 6,468,670 B1 | 10/2002 | Ikeda et al. | |
| 6,781,801 B2 * | 8/2004 | Heinonen et al. | 360/324.2 |
| 6,791,805 B2 * | 9/2004 | Heinonen et al. | 360/324.11 |
| 7,616,412 B2 | 11/2009 | Zhu et al. | |
| 7,684,161 B2 * | 3/2010 | Pietambaram et al. | 360/324.12 |
| 7,813,079 B2 | 10/2010 | Kawato et al. | |
| 8,289,648 B2 * | 10/2012 | Kief et al. | 360/125.12 |
| 2008/0055777 A1 | 3/2008 | Rou et al. | |
| 2010/0214692 A1 * | 8/2010 | Kief et al. | 360/125.03 |

OTHER PUBLICATIONS

"Oscillations in Exchange Coupling and Magnetoresistance in Metallic Superlattice Structures: Co/Ru, Co/Cr, and Fe/Cr," by S. S. P. Parkin et al., Physical Review Letters, vol. 64, No. 19, May 7, 1990, The American Physical Society, pp. 2304-2308.

* cited by examiner

*Primary Examiner* — Mark Blouin
(74) *Attorney, Agent, or Firm* — Saile Ackerman LLC; Stephen B. Ackerman

(57) ABSTRACT

A perpendicular magnetic recording (PMR) head is fabricated with a main pole and a trailing edge shield having surfaces and interior portions that may include synthetic anti-ferromagnetic multi-layered superlattices (SAFS) formed on and/or within them respectively. The SAFS, which are multilayers formed as periodic multiples of antiferromagnetically coupled tri-layers, provide a mechanism for enhancing the component of the writing field that is vertical to the magnetic medium by exchange coupling to the magnetization of the pole and shield and constraining the directions of their magnetizations to lie within the film plane of the SAFS.

27 Claims, 4 Drawing Sheets

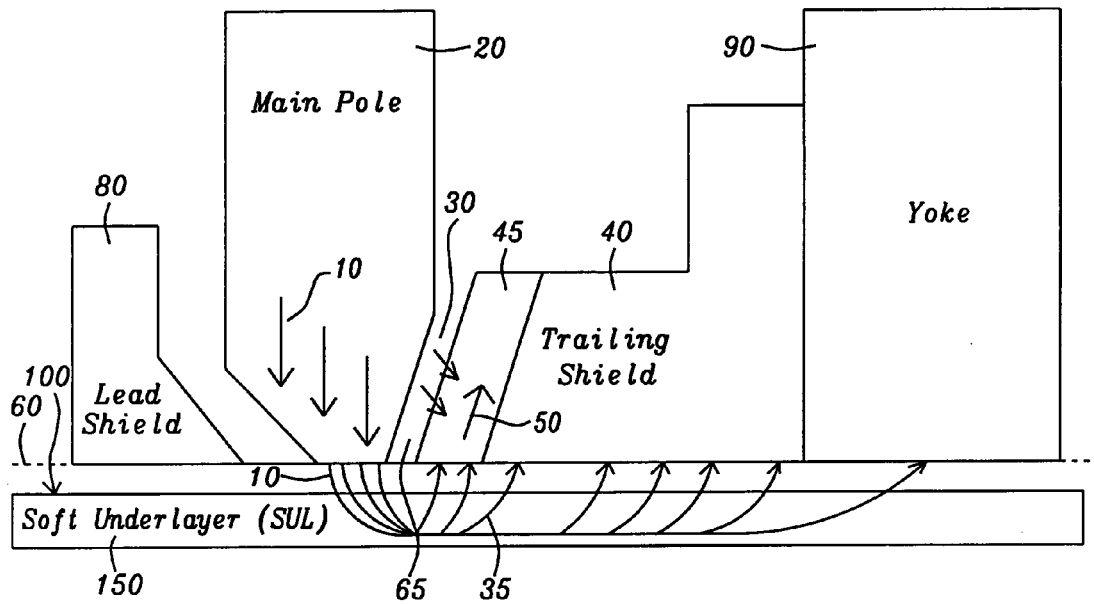
FIG. 1 — Prior Art
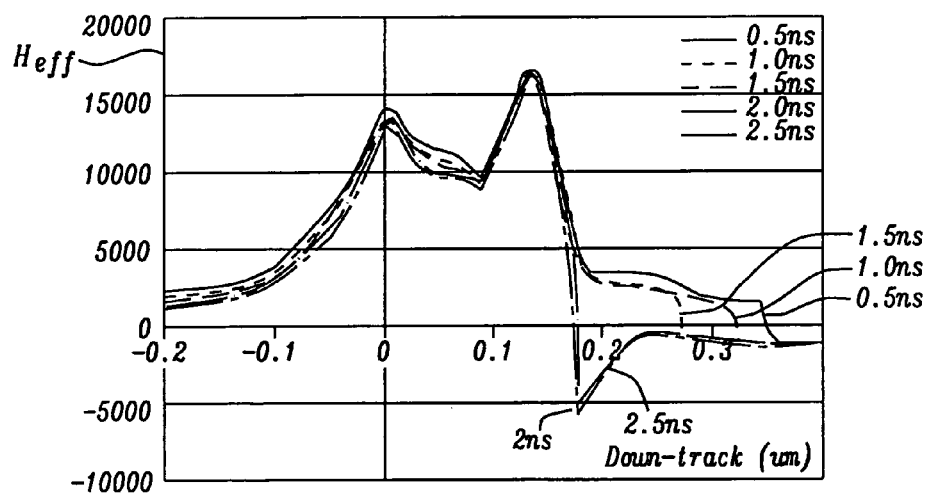
FIG. 2 — Prior Art

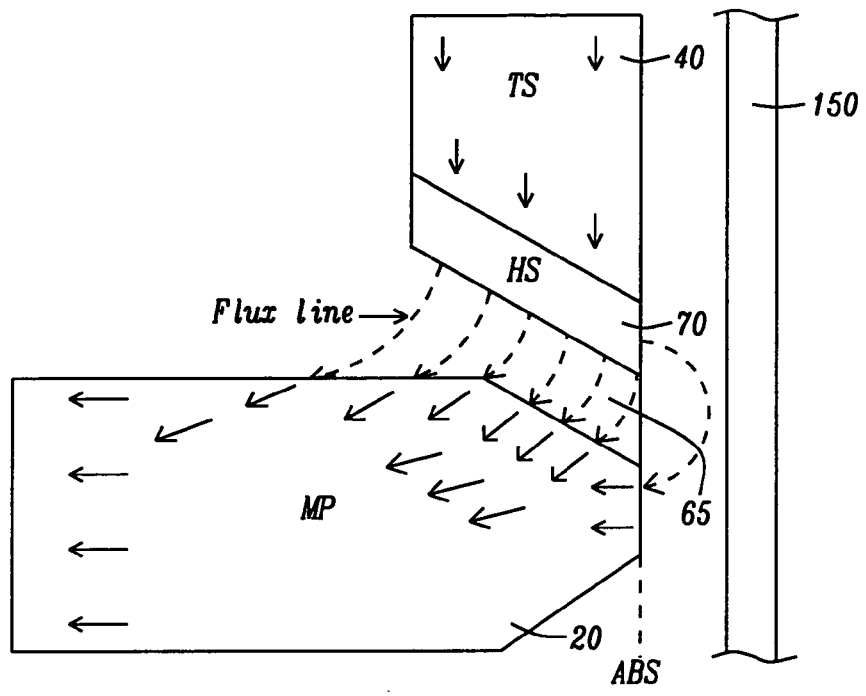
FIG. 3 – Prior Art
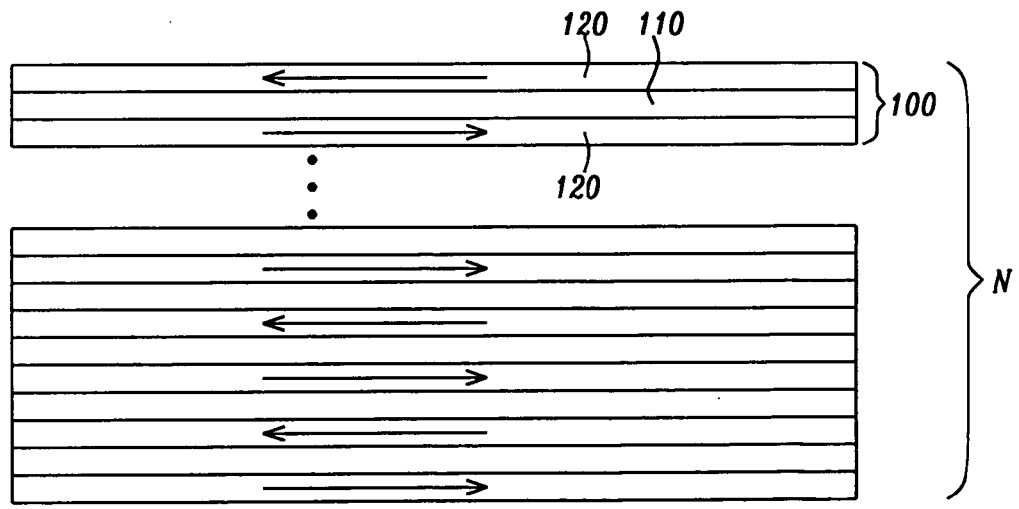
FIG. 4

WRITER DESIGN WITH ENHANCED WRITABILITY

BACKGROUND OF THE INVENTION

1. Field of the Invention

This invention relates to the fabrication of a perpendicular magnetic recording (PMR) write head whose main pole is coupled to a synthetic magnetic super-lattice (SAFS) which will enhance the magnetization components perpendicular to the ABS that lie along the film plane of the SAFS. The enhancement of this in-plane magnetization component can increase the write field.

2. Description of the Related Art

The increasing need for high recording area densities (up to 1 Tb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities are required to increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed within a magnetic layer, perpendicular to the disk surface, while a soft magnetic underlayer (SUL) formed beneath the magnetic layer acts as a stabilizing influence on these perpendicular domain structures. Thus, a magnetic recording head that produces a field capable of forming domains perpendicular to a disk surface, when used in conjunction with such perpendicular recording media, is able to produce a stable recording with a much higher area density than is possible using standard longitudinal recording.

Since their first use, the PMR head has evolved through several generations. Initially, the PMR head was a monopole, but that design was replaced by a shielded head design with a trailing edge shield (TS), which, due to its negative field, provides a high field gradient in the down-track direction to facilitate recording at high linear densities.

Side shields (SS) then began to be used in conjunction with the trailing edge shields, because it was necessary to eliminate the fringing side fields in order to increase writing density still further. Unfortunately, despite the benefits they provided, the presence of these shields inevitably reduces the field produced by the main pole because the basis of their operation is the removal of portions of the flux of that field. Therefore, as long as design functionalities can be achieved, it is important to reduce any additional flux shunting by the shields from the main pole. This is a particularly important consideration for future PMR writer designs which utilize increasingly small pole tips. In addition, in order to address the problem of wide area track erasure (WATE), it is desirable to increase the throat height of the trailing shield by making it thick. This additional thickness shunts additional flux away from the pole itself.

In today's quest for very high density magnetic recording it is essential to improve the bit error rate (BER). This requires an increase in the recorded bits per inch (BPI) As the data rate for writing increasing rapidly to the GHz range, it is also important to increase the data rate capability of the writer without losing the BER. At today's state-of-the-art rate of 750 Gb/in$^2$ areal density, the physical width of the writer is reduced to only ≈50 nm (nanometers), with a write gap reduced to sub-30 nm dimensions. The reduction of writer dimensions poses a significant challenge to maintain the write field strength and field gradient for OW, BER and adequate frequency response, since most of the writing flux will be shunted from the main pole to the trailing shield without an adequate magnetization component along the direction that is vertical to the ABS plane. The critical aspect of writer design to achieve the high writing field, high field gradient and frequency response is to engineer the magnetization configuration and response of the main pole and trailing shield region.

Referring first to schematic FIG. 1, there is shown a side cross-sectional view of components of a prior art PMR write head, with its ABS end (dashed line (60)) positioned over a perpendicular recording type magnetic medium (100) having a magnetically soft underlayer (SUL) (150). There is shown a lead shield (80), a main pole (20), a trailing shield (40), a write gap (65) between the main pole and the trailing shield and a yoke (90). Note that these components generally project backwards (away from the ABS) so that the yoke and main pole have a closed configuration, but that extended view is not shown here. The trailing shield (40) is grown on a high magnetic moment (high Ms) seed layer (45). The medium (100) is moving from the lead shield towards the trailing shield.

During writing, magnetic flux (10) emerges from the main pole (20) and takes two paths. A first path (30) is directly shunted to the trailing shield (40) through the write gap (65), which drives the magnetization of the trailing shield (50) to be parallel to the ABS (60) of the writer. Since the medium is responsive to a vertical field, this flux component is not useful for writing and it should be reduced. Another flux path (35) emerges from the pole tip, passes through the soft magnetic under layer (SUL) (150) at the bottom of the magnetic medium and returns to the trailing shield (40). This component of the flux is the one actually doing the writing on the medium. For good write performance the flux emerging from the main pole and entering the medium needs to have a strong vertical (perpendicular to the ABS) component and it should have some vertical component relative to its re-entrance into the ABS of the trailing shield to efficiently close the flux loop. Therefore, it is advantageous to increase the vertical magnetization of both the main pole and the trailing shield adjacent to the write gap.

The effects of the write field of a prior art configuration such as that shown in FIG. 1 can be obtained from the graph shown in FIG. 2. The graph of FIG. 2 is a micromagnetic modeling result showing the magnitude profile of a down-track write field, as a function of elapsed time after write-current switching. The magnitude, $H_{\it{eff}}$ is measured in Oe along the graph ordinate and the down-track position is measured along the abscissa in microns (μm) down track from the pole tip. Five measurement times are superimposed, from 0.5 ns (nanoseconds) to 2.5 ns after the field is shut off.

Two conclusions can be drawn from the graph.

1) the trailing shield magnetization response is lagging behind the main pole field and, 2) the maximum field gradient depends on the positive and negative peak values of $H_{\it{eff}}$ and their spacing.

In this modeling experiment, the magnetization of the trailing shield has a component in the same direction as that of the main pole, from times of 0.5 to 1.5 ns, as evidenced by the same polarity of the writing field under the trailing shield. Beginning at 2 ns, however, this trailing shield flux polarity switches direction, providing some anti-parallel component to the main pole magnetization and, thereby, generating a negative dip in the field profile which produces a high field gradient. This effect is greatest at 2 ns and 2.5 ns where the switch in polarity of the field from an $H_{eff}$ of approximately 17 kOe to an $H_{eff}$ of approximately −5 kOe (opposite direction) is due to some component of the trailing shield flux which is anti-parallel to the flux emerging from the pole tip.

These results imply that it will be advantageous to have a writer design which enhances the flux component vertical to the ABS between the main pole and the trailing shield and thereby enhances the write field strength and the field gradient. We shall use the approach of antiferromagnetically coupled superlattices (SAFS), described fully below, to achieve the desired design properties.

S. Parkin, et al., in "Oscillations in Exchange Coupling and Magnetoresistance in Metallic Superlattice Structures," Phys. Rev. Lett., 64, pp. 2304, 1990, describes the properties of a {[Co20A/Ru3A]×20} superlattice. Superlattices have also been discussed in the prior arts in applications to writers as well as magnetic media and magnetic oscillators by others than Parkin et al. cited above. Additional examples can be found in Kief et al. (US Patent Appl. 2010/0214692), Rou et al. (US Patent Appl. 2008/0055777), Zhu et al. (U.S. Pat. No. 7,616,412), Kawato et al. (U.S. Pat. No. 7,813,079), and Ikeda et al. (U.S. Pat. No. 6,468,670). None of these prior arts teach the method to be described in detail below.

SUMMARY OF THE INVENTION

A first object of this invention, therefore, is to design and fabricate a PMR writer with a pole and shield configuration that improves the performance of a PMR write head.

A second object of the present invention is design and fabricate such a PMR writer with a pole and trailing shield configuration that enhances the write field strength and field gradient of the shielded pole.

A third object of the present invention is to satisfy the first two objects with a trailing shield configuration and material structure that enhances the flux component of the magnetic write field that is perpendicular to the surface of the magnetic medium and is, therefore, most important in improving the write process.

These objects will be met by a pole and trailing shield design whose combined magnetization is forced into a desired direction. That desired direction is perpendicular to the recording medium and the forcing is achieved by an antiferromagnetic coupling to a synthetic antiferromagnetic super-lattice (SAFS) structure.

In the present writer design, as illustrated in schematic prior art FIG. 3, there is shown a main pole (20), a trailing shield (40) and a write gap (65) between them. The ABS edge of the structure is denoted "ABS". The trailing shield (40) is grown on a high magnetic moment (high Ms) seed layer (45) denoted "HS" in the figure. The SUL magnetic medium (150) beneath the ABS of the writer is to be visualized as moving from the pole towards the trailing shield. As is shown schematically, the instant magnetization of the main pole (arrows) is severely tilted away from the ABS plane direction in the vicinity of the write gap (65). In particular, the magnetization direction at the beveled edge of the main pole (70) is nearly perpendicular to that edge, which promotes a flux loop (dashed and curved arrows) that is not optimally perpendicular to the ABS surface of the medium (150). The effective write field strength is limited by this lack of verticality to the ABS plane. In the present invention, we will utilize a synthetic antiferromagnetic super-lattice structure (SAFS) of the following form:

{[ferromagnetic (FM)/transition metal (TM)/ferromagnetic (FM)]×N} which is a multi-layered structure formed of a transition metal (TM) layer sandwiched between two ferromagnetic layers (FM), i.e. a FM/TM/FM tri-layer, with the tri-layer then repeated N times (×N) so that it has period (i.e., multiplicity) N. This SAFS will be used to produce the desired alignment of the magnetic components of the main pole by constraining and redirecting those components to lie along the film plane (i.e. the layer deposition plane) of the SAFS layers. Thus, in the present invention the SAFS constrains the magnetization of the main pole and trailing shield to lie in its film plane, which then enhances the vertical magnetization flux component that is responsible for the writing process.

The magnetizations of the ferromagnetic (FM) material layers are antiferromagnetically coupled (in opposite directions) through the transition metal (TM) layer as illustrated schematically in FIG. 4.

In FIG. 4, there can be seen schematically a multilayered SAFS formed as N multiples of identical tri-layered configurations (100), each comprising a transition metal layer (TM) (110), such as a layer of any of the 3d-5d transition metals: Ru, Rh, Cr, Cu, Au, V, Nb, Mo, Ta, W, Re, or Ir, formed to a thickness between approximately 2 angstroms and 30 angstroms, sandwiched between two ferromagnetic (FM) layers (120), such as layers of Co, Fe, Ni and their alloys, that are preferably formed to a thickness between approximately 5 angstroms and 500 angstroms. Each of the N multiples is separated from its neighbor by a transition metal layer (110). The magnetizations (arrows) of the two FM layers in each of the N multiples are oppositely directed to each other, being coupled across the intervening TM layer and thereby producing the synthetic antiferromagnetic configuration (SAF). The overall thickness of the write gap formed in this manner can be from approximately 5 nm (nanometers) to approximately 100 nm.

The saturation field ($H_s$) needed to align all the FM material layer magnetizations within the super-lattice needs to be very high to keep the magnetization of the FM layer in its film plane under the influence of the writer gap field which is typically in the range of between approximately 1.5 and 2.4 Tesla (T). The $H_s$ of the SAFS can be tuned by choosing the material and thickness of the FM and TM layers and by choice of the period, N. For example, S. Parkin, et al., cited above, in "Oscillations in Exchange Coupling and Magnetoresistance in Metallic Superlattice Structures," Phys. Rev. Lett., 64, pp. 2304, 1990, describes a {[Co20A/Ru3A]×20} super-lattice which has $H_s$>7.0 T. Since $H_s$ is inversely proportional to the thickness of the FM layer, it can reach ≈28 T for a {[Co5A/Ru3A]×20} super-lattice which is much greater than the gap field of between approximately 1.5 and 2.4 T. Therefore, its magnetization will be kept in-plane. The magnetization of the entire SAFS system has a very small in-plane anisotropic field and it is very easy to rotate in the film plane.

BRIEF DESCRIPTION OF THE DRAWINGS

FIG. 1 is a schematic cross-sectional view, perpendicular to the ABS plane, of a prior art PMR writer having a main pole tip shielded on a trailing side and a leading side, showing the flux paths through a magnetic medium having a soft magnetic underlayer (SUL).

FIG. 2 is a prior art graphical representation showing the down-track write-field profile of a prior art writer such as that in FIG. 1 at five different times after switching of the write current.

FIG. 3 is a schematic cross-sectional view, perpendicular to the ABS plane, of a prior art PMR writer, such as that in FIG.

1, showing the tilting of the magnetization (arrows) of the pole and trailing shield in the vicinity of the write gap.

FIG. 4 is a schematic cross-sectional view, perpendicular to the ABS plane, of a periodic SAFS, such as that to be used in the present invention, comprising N replicas of a tri-layered structure consisting of a transition metal layer sandwiched by two ferromagnetic layers.

Figure 5:
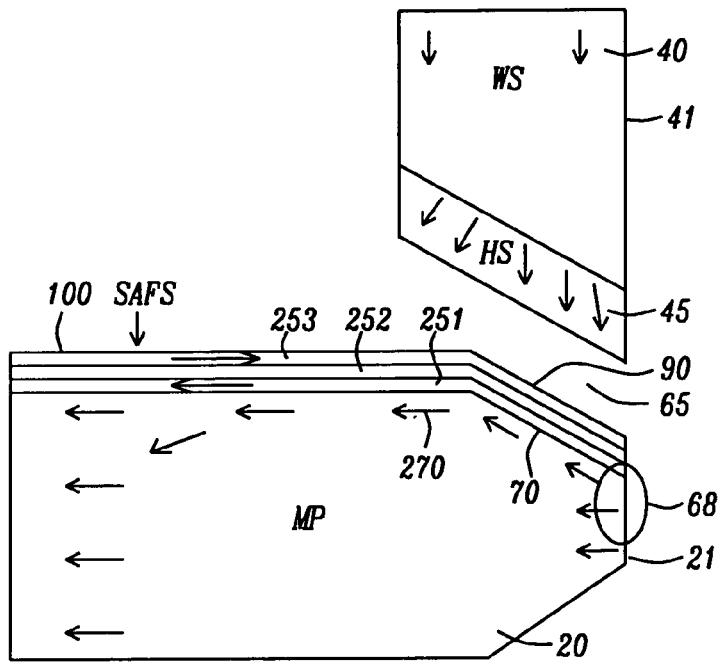

FIG. 5 is a schematic cross-sectional view, perpendicular to the ABS plane, of a first embodiment of the present PMR in which the surface of the main pole adjacent to the write gap is covered by a SAFS and showing the resulting constrained magnetizations.

Figure 6:
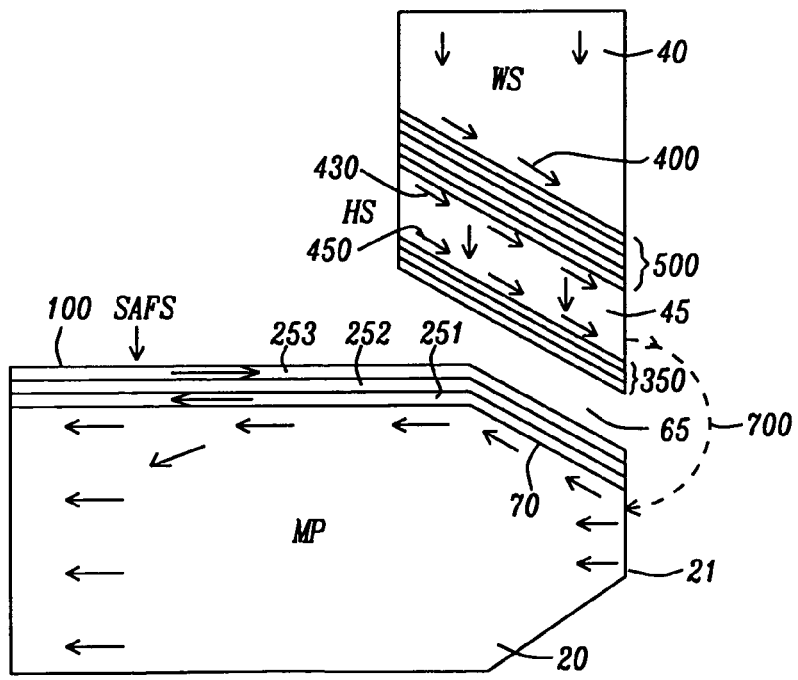

FIG. 6 is a schematic cross-sectional view, perpendicular to the ABS plane, of a second embodiment of the present PMR in which the surface of the main pole adjacent to the write gap and the surface of the trailing shield seed layer adjacent to the write gap and/or the surface of the trailing shield above the seed layer are covered by a SAFS and showing the resulting constrained magnetizations.

Figure 7:
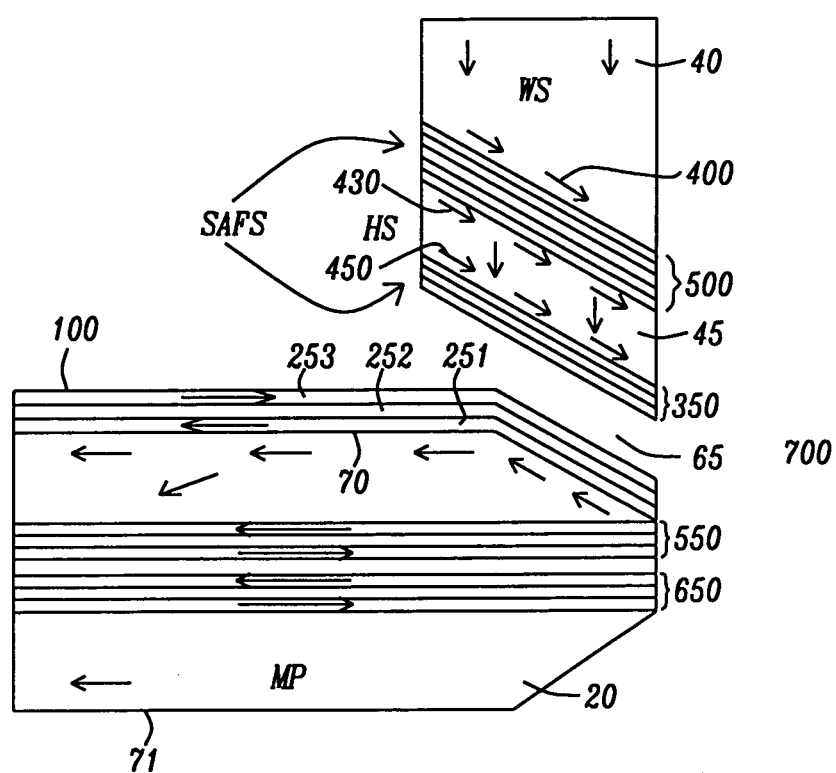

FIG. 7 is a schematic cross-sectional view, perpendicular to the ABS plane, of a third embodiment of the present PMR in which the surface of the main pole adjacent to the write gap and/or a portion of the interior of the main pole and the surface of the trailing shield seed layer adjacent to the write gap and/or the surface of the trailing shield above the seed layer are covered by or include a SAFS and showing the resulting constrained magnetizations.

DESCRIPTION OF THE PREFERRED EMBODIMENTS

The embodiments of the present invention are a main pole and trailing shield configuration in which various placements of a synthetic antiferromagnetic superlattice (SAFS) on and in both the main pole and trailing shield cause a tilting of the magnetizations that constrains the magnetizations to lie along the superlattice layer planes and, thereby, enhances both a vertical component of the effective writing field of the pole/shield combination as well as its gradient.

First Embodiment

Referring first to FIG. 5 there is shown schematically, in a cross-sectional view taken in a plane perpendicular to the ABS plane, a main pole (20) and trailing shield (40) PMR design in which their combined magnetization (for writing on a magnetic medium) is forced into a desired direction perpendicular to the ABS by the formation of a SAFS layer (100) on a trailing edge (70) of the main pole.

In the figure there is shown the main pole (20) having an ABS planar end (21) and an adjacent trailing shield (40), formed adjacent to the trailing edge side (70) of the main pole. The trailing shield has an ABS planar surface (41) that is co-planar with the ABS end (21) of the main pole. There is also a write gap (65) formed by a separation between the main pole (20) and the shield (40). More specifically, the write gap is formed by a separation between two adjacent beveled surfaces: (90) (the trailing edge surface of the SAFS layer), and (71) the lower (leading edge) surface of the shield. It can be seen that surface (90) extends away from the ABS end and is the trailing edge surface of a layered SAFS structure (100). The SAFS structure (100) is formed contiguously on the actual trailing edge surface (70) of the pole. Surface (90) has a slight downward bevel at the similarly beveled ABS end (21) of the pole, whereby the beveled portion becomes substantially parallel to the lower surface (71) of the shield. The separation between (90) and (71) forms the write gap (65).

The trailing shield (40) is grown on a high magnetic moment (high Ms) seed layer (45) denoted HS, whose bottom surface (71) is the surface partially forming the write gap.

As is seen, the main pole has an SAFS multilayer (100) formed on the actual trailing edge pole surface (70) adjacent to the write gap (65). In this illustration, the SAFS is shown as an exemplary period 1 (N=1) structure, having a first FM layer (251) formed on the main pole surface, a TM layer (252) formed on the first FM layer (251) and a second FM layer (253) formed on the TM layer. In this and all other embodiments, however, the SAFS can be a multilayer with N>=1.

As is shown by arrows in each layer of the multi-layered SAFS, the FM layer (251) has a magnetization directed away from the ABS. As is shown schematically by the arrows in the encircled region (60), the magnetization of the main pole (arrows) is now tilted by the strong antiferromagnetic coupling (Hs) between the SAFS and the main pole so that it is in a direction that is perpendicular to the ABS plane. In short, the multi-layered SAFS constrains the magnetization of the main pole to lie along the planes of the multi-layer. The constraint is provided by the antiferromagnetic coupling between the SAFS and the magnetization of the main pole on which it is formed. We shall see this same effect in each of the following embodiments as well, except that in the following embodiments additional SAFS are formed that provide additional constraining forces on the magnetizations of the structures on or in which they are formed. Thus, the magnetization (as shown by arrows (270)) along the inner surface of the beveled edge (70) is substantially parallel to the beveled edge itself and to the entire length of the upper pole surface and is held in that position by the anti-ferromagnetic coupling to the SAFS. Referring back to FIG. 3, it can be seen that the magnetization direction along the beveled edge of the main pole ((70) in FIG. 3) is substantially perpendicular to that edge, which does not enhance the perpendicularity of the field.

Second Embodiment

Referring to schematic FIG. 6, there is shown schematically a second preferred embodiment of the invention in which there is shown, in a cross-sectional view taken in a plane perpendicular to the ABS plane, a main pole and trailing shield design in which their combined magnetization is forced into and constrained within a desired direction by the formation of SAFS layers on both the main pole, as in the first preferred embodiment, and also on the write gap surface of the trailing shield and within the body of the shield as well. The desired direction is along the layer planes of the various SAFS and the magnetizations are constrained to lie in those directions by antiferromagnetic coupling to the SAFS.

The main pole (20) has an SAFS multilayer (100) formed on a trailing edge (70) side adjacent to the write gap (65) as in the first preferred embodiment. In this illustration, the SAFS is an exemplary period 1 (N=1) structure, having a first FM layer (251) formed on the main pole surface, a TM layer (252) formed on the first FM layer (251) and a second FM layer (253) formed on the TM layer. In general, however, N will be >=1.

The trailing shield (40) has, in this example of the embodiment, two SAFS layers (although either one by itself is possible alternative embodiment): an exemplary period 1 (N=1) multi-layer (350) formed on the lower surface of the high $M_s$ (HS) seed layer (45) and an exemplary period two (N=2) multi-layer (500) formed between the seed layer (45) and the body of the shield (40). Note that the seed layer (45) together with the SAFS multi-layer (500) formed on it may be considered as an extended seed layer on which the remainder of the trailing shield may be plated. The arrows (400), (430) and (450) represent magnetization directions that are held in place and constrained by the SAFS magnetizations and forced in the direction of the SAFS film planes. The flux lines (700) emerging from the trailing shield in accord with these magnetization arrows will promote flux loops with the main pole that will have an enhanced perpendicularity with the ABS plane.

Third Embodiment

Referring to schematic FIG. 7, there is shown schematically a third preferred embodiment of the invention which is similar to the second preferred embodiment except that one or more SAFS (550), (650) are also formed within the body of the main pole (20) running axially backwards, away from the ABS plane and substantially parallel to the trailing (70) and leading (71) edges of the main pole.

The main pole (20) still has an SAFS multi-layer (100) formed on a trailing edge side adjacent to the write gap (65) as in the first and second preferred embodiments. In this illustration, the three SAFS, (100), (550) and (650) are each a period 1 (N=1) structure, as an example. As is the case with the surface SAFS (100), the internally formed SAFS (550) and (650) promote a magnetization direction that is perpendicular to the ABS plane throughout the interior of the main pole by constraining the magnetizations internal to the main pole to lie along the layer planes of the SAFS by means of antiferromagnetic coupling to the SAFS.

The trailing shield (40), in this embodiment, exactly as in the second preferred embodiment, has two SAFS layers (although either one by itself is possible): a multi-layer (350) formed on the lower surface of the high $M_s$(HS) seed layer (45) and an exemplary period two (N=2) multi-layer (500), which can be one or more (N>=1), formed between the seed layer (45) and the body of the shield (40). As noted above, the seed layer/SAFS combination may now serve as a seed layer. The arrows (400), (430) and (450) represent magnetization directions that are held in place by the antiferromagnetic coupling to the SAFS. The flux lines emerging from the trailing shield will now promote flux loops with the main pole that will have an enhanced perpendicularity with the ABS plane.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a main pole and trailing edge shield incorporating SAFS formed on surfaces as well as interior portions, thereby promoting a magnetic writing field with enhanced perpendicularity to the ABS plane, while still forming and providing such a PMR head and its method of formation in accord with the spirit and scope of the present invention as defined by the appended claims.

What is claimed is:

1. A PMR head comprising:
a main pole having an ABS end and a trailing edge surface extending away from said ABS end;
a trailing shield having an ABS edge that is co-planar with said ABS end of said main pole, wherein said trailing shield is formed on a seed layer having a high magnetic moment and wherein said seed layer has a lower surface that forms a leading edge of a write gap;
a synthetic antiferromagnetic multi-layered superlattice (SAFS) formed on said trailing edge surface of said main pole, wherein said SAFS constrains the magnetizations of said main pole to lie along layer planes of said SAFS; and
a write gap formed by a separation between said SAFS and said seed layer lower surface.

2. A PMR head comprising:
a main pole having an ABS end and a trailing edge surface extending away from said ABS end;
a trailing shield having an ABS edge that is co-planar with said ABS end of said main pole, wherein said trailing shield is formed on a seed layer having a high magnetic moment and wherein said seed layer has a lower surface that is adjacent to said trailing edge of said main pole;
a first synthetic antiferromagnetic multi-layered superlattice (SAFS) formed on said trailing edge surface of said main pole, a second SAFS formed on said lower surface of said trailing shield seed layer and, optionally, a third SAFS formed above said seed layer wherein said first SAFS constrains the magnetizations of said main pole to lie along layer planes of said first SAFS and wherein said second and third SAFS constrains the magnetizations of said trailing shield to lie along layer planes of said second and third SAFS; and
a write gap formed by a separation between said first and second SAFS.

3. A PMR head comprising:
a main pole having an ABS end and substantially parallel trailing edge and leading edge surfaces extending away from said ABS end;
a trailing shield having an ABS edge that is co-planar with said ABS end of said main pole, wherein said trailing shield is formed on a seed layer having a high magnetic moment and wherein said seed layer has a lower surface that forms an edge of a write gap;
a first synthetic antiferromagnetic multi-layered superlattice (SAFS) formed on said trailing edge surface of said main pole, a third SAFS formed within said main pole substantially midway between said trailing edge and said leading edge, extending axially backwards from said ABS end, a third SAFS formed on said lower surface of said trailing shield and, optionally, a fourth SAFS formed above said seed layer wherein said first and third SAFS constrains the magnetizations of said main pole to lie along layer planes of said first and third SAFS and wherein said second and fourth SAFS constrains the magnetizations of said trailing shield to lie along layer planes of said second and fourth SAFS; and
a write gap formed by a separation between said first and second SAFS.

4. The PMR head of claim 1 wherein said SAFS is a multilayer structure comprising at least one tri-layer formed as a layer of 3d-5d transition metal sandwiched on each side by a layer of ferromagnetic material, wherein said layers of ferromagnetic material are magnetized, within their planes of formation, in antiparallel directions that are magnetically coupled across said transition metal layer.

5. The PMR head of claim 2 wherein each of said first, second and third SAFS is a multilayer structure comprising at least one tri-layer formed as a layer of 3d-5d transition metal sandwiched on each side by a layer of ferromagnetic material, wherein said layers of ferromagnetic material are magnetized, within their planes of formation, in antiparallel directions that are magnetically coupled across said transition metal layer.

6. The PMR head of claim 3 wherein each of said first, second, third and fourth SAFS is a multilayer structure comprising at least one tri-layer formed as a layer of 3d-5d transition metal sandwiched on each side by a layer of ferromagnetic material, wherein said layers of ferromagnetic material are magnetized, within their planes of formation, in antiparallel directions that are magnetically coupled across said transition metal layer.

7. The PMR head of claim 4 wherein said layer of 3d-5d transition metal is a layer of Ru, Rh, Cr, Cu, Au, V, Nb, Mo, Ta, W, Re or Ir that is formed to a thickness of between approximately 2 angstroms and 30 angstroms and wherein said layers of ferromagnetic material are layers of Co, Fe, Ni and their alloys and they are formed to thicknesses between approximately 5 angstroms and 500 angstroms.

8. The PMR head of claim 5 wherein said layer of 3d-5d transition metal is a layer of Ru, Rh, Cr, Cu, Au, V, Nb, Mo, Ta, W, Re or Ir that is formed to a thickness of between approximately 2 angstroms and 30 angstroms and wherein said layers of ferromagnetic material are layers of Co, Fe, Ni and their alloys and they are formed to thicknesses between approximately 5 angstroms and 500 angstroms.

9. The PMR head of claim 6 wherein said layer of 3d-5d transition metal is a layer of Ru, Rh, Cr, Cu, Au, V, Nb, Mo, Ta, W, Re or Ir that is formed to a thickness of between approximately 2 angstroms and 30 angstroms and wherein said layers of ferromagnetic material are layers of Co, Fe, Ni and their alloys and they are formed to thicknesses between approximately 5 angstroms and 500 angstroms.

10. The PMR head of claim 4 wherein said SAFS is a multilayer structure formed as a repetition of N identical replicas of said tri-layered structures, said replicas being formed contiguously on each other, thereby forming a periodic structure of period N.

11. The PMR head of claim 10 wherein N is greater than or equal to 1.

12. The PMR head of claim 5 wherein each said SAFS is a multilayer structure formed as a repetition of N identical replicas of said tri-layered structures, said replicas being formed contiguously on each other, thereby forming a periodic structure of period N.

13. The PMR head of claim 12 wherein N is greater than or equal to 1.

14. The PMR head of claim 4 wherein each said SAFS is a multilayer structure formed as a repetition of N identical replicas of said tri-layered structures, said replicas being formed contiguously on each other, thereby forming a periodic structure of period N.

15. The PMR head of claim 14 wherein N is greater than or equal to 1.

16. The PMR head of claim 1 wherein said SAFS constrains the magnetizations of said main pole and said trailing shield to lie along layer planes of said SAFS by means of antiferromagnetic coupling between said main pole and said SAFS.

17. The PMR head of claim 2 wherein said SAFS constrains the magnetizations of said main pole and said trailing shield to lie along layer planes of said SAFS by means of antiferromagnetic coupling between each said SAFS and the magnetization of the structure on which it is formed.

18. The PMR head of claim 3 wherein said SAFS constrains the magnetizations of said main pole and said trailing edge shield to lie along layer planes of said SAFS by means of antiferromagnetic coupling between each said SAFS and the magnetization of the structure on which it is formed.

19. A method of forming a PMR head comprising:
providing a main pole having an ABS end and a trailing edge surface extending away from said ABS end;
forming a trailing shield having an ABS edge that is co-planar with said ABS end of said main pole, wherein said trailing shield is formed on a seed layer having a high magnetic moment and wherein said seed layer has a lower surface that forms a leading edge of a write gap;
forming a synthetic antiferromagnetic multi-layered superlattice (SAFS) on said trailing edge surface of said main pole, wherein said SAFS constrains the magnetizations of said main pole to lie along layer planes of said SAFS.

20. A method of forming a PMR head comprising:
providing a main pole having an ABS end and a trailing edge surface extending away from said ABS end;
forming a trailing shield having an ABS edge that is co-planar with said ABS end of said main pole, wherein said trailing shield is formed on a seed layer having a high magnetic moment and wherein said seed layer has a lower surface that is adjacent to said trailing edge of said main pole;
forming a first synthetic antiferromagnetic multi-layered superlattice (SAFS) on said trailing edge surface of said main pole, forming a second SAFS on said lower surface of said trailing shield seed layer and, optionally, forming a third SAFS above said seed layer wherein said first SAFS constrains the magnetizations of said main pole to lie along layer planes of said first SAFS and wherein said second and, optionally, the third SAFS constrains the magnetizations of said trailing shield to lie along layer planes of said second and third SAFS.

21. A method of forming a PMR head comprising:
providing a main pole having an ABS end and substantially parallel trailing edge and leading edge surfaces extending away from said ABS end;
forming a trailing shield having an ABS edge that is co-planar with said ABS end of said main pole, wherein said trailing shield is formed on a seed layer having a high magnetic moment and wherein said seed layer has a lower surface that forms an edge of a write gap;
forming a first synthetic antiferromagnetic multi-layered superlattice (SAFS) on said trailing edge surface of said main pole, forming a third SAFS within said main pole substantially midway between said trailing edge and said leading edge, extending axially backwards from said ABS end, forming a third SAFS on said lower surface of said trailing shield and, optionally, forming a fourth SAFS above said seed layer wherein said first and third SAFS constrains the magnetizations of said main pole to lie along layer planes of said first and third SAFS and wherein said second and said optional fourth SAFS constrains the magnetizations of said trailing shield to lie along layer planes of said second and fourth SAFS.

22. The method of claim 19 wherein said SAFS is formed as a multi-layer of N tri-layered structures, each tri-layered structure comprising a layer of the 3d-5d transition metal Ru, Rh, Cr, Cu, Au, V, Nb, Mo, Ta, W, Re or Ir that is formed to a thickness of between approximately 2 angstroms and 30 angstroms, sandwiched on either side by a layer of the ferromagnetic material Co, Fe, Ni and their alloys formed to thicknesses between approximately 5 angstroms and 500 angstroms.

23. The method of claim 22 wherein said SAFS is magnetized so that the saturation magnetization, $H_s$ of said layers of ferromagnetic material exceeds the magnetic field of the write gap during the writing process, which is typically between approximately 1.5 and 2.4 Tesla, whereby magnetization of said SAFS is sufficient to remain within the layer planes of said SAFS during writing processes.

24. The method of claim 20 wherein said SAFS is formed as a multi-layer of N tri-layered structures, each tri-layered structure comprising a layer of the 3d-5d transition metal Ru, Rh, Cr, Cu, Au, V, Nb, Mo, Ta, W, Re or Ir that is formed to a thickness of between approximately 2 angstroms and 30 angstroms, sandwiched on either side by a layer of the ferromagnetic material Co, Fe, Ni and their alloys formed to thicknesses between approximately 5 angstroms and 500 angstroms.

25. The method of claim 24 wherein said SAFS is magnetized so that the saturation magnetization, $H_s$ of said layers of ferromagnetic material exceeds the magnetic field of the write gap during the writing process, which is typically between approximately 1.5 and 2.4 Tesla, whereby magnetization of said SAFS is sufficient to remain within the layer planes of said SAFS during writing processes.

26. The method of claim 21 wherein said SAFS is formed as a multi-layer of N tri-layered structures, each tri-layered structure comprising a layer of the 3d-5d transition metal Ru, Rh, Cr, Cu, Au, V, Nb, Mo, Ta, W, Re or Ir that is formed to a thickness of between approximately 2 angstroms and 30 angstroms, sandwiched on either side by a layer of the ferromagnetic material Co, Fe, Ni and their alloys formed to thicknesses between approximately 5 angstroms and 500 angstroms.

27. The method of claim 26 wherein said SAFS is magnetized so that the saturation magnetization, $H_s$ of said layers of ferromagnetic material exceeds the magnetic field of the write gap during the writing process, which is typically between approximately 1.5 and 2.4 Tesla, whereby magnetization of said SAFS is sufficient to remain within the layer planes of said SAFS during writing processes.

* * * * *